G. A. FORD.

Pulley-Blocks.

No. 5,784.

Reissued March 10, 1874.

Witnesses.

A. F. Cornett.

E. W. Old

Inventor.

George A. Ford.

Per Busridge & Co.

Attys.

AM. PHOTO-LITHOGRAPHIC CO. N. Y. (OSBORNE'S PROCESS)

UNITED STATES PATENT OFFICE.

GEORGE A. FORD, OF CLEVELAND, OHIO.

IMPROVEMENT IN PULLEY-BLOCKS.

Specification forming part of Letters Patent No. 142,095, dated August 26, 1873; reissue No. 5,784, dated March 10, 1874; application filed February 12, 1874.

*To all whom it may concern:*

Be it known that I, GEORGE A. FORD, of Cleveland, in the county of Cuyahoga and State of Ohio, have invented a certain new and useful Improvement in Pulley-Blocks; and I do hereby declare that the following is a full, clear, and complete description, reference being had to the accompanying drawings making part of the same.

Figure 1:
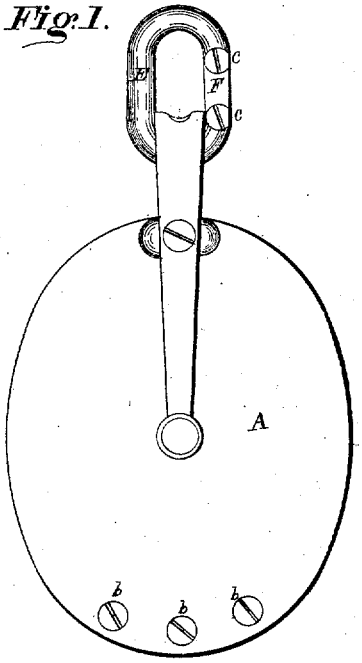
Figure 2:
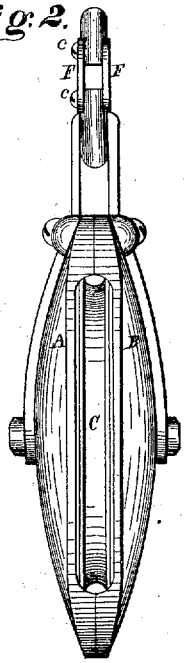

Figure 1 is a side view of the pulley-block. Fig. 2 is an edge view. The rest of the figures are detached sections, to which reference will be made.

The nature of this invention relates to a pulley-block, which has for its object the construction of the sheave with a wide hub, so that it may have a broad bearing-surface on the spindle. It also relates to the construction of the cheeks or shell of the block, made convex-concavo, whereby the cheeks are made stronger and lighter, in proportion to the weight of material than the cheeks of the ordinary pulley-block.

Figure 3:
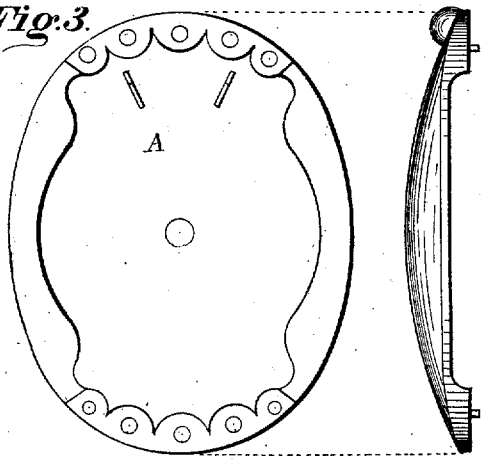
Figure 4:
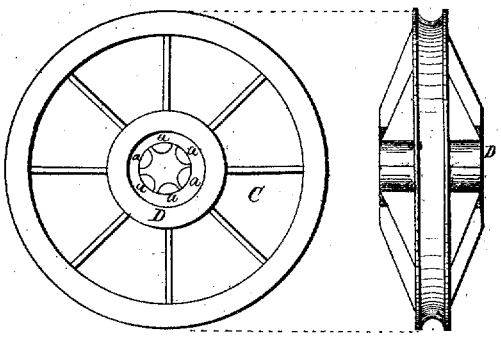
Figure 5:
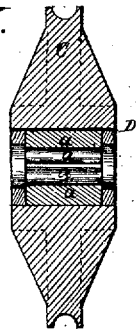

The above-specified pulley-block consists of the sides or shell A B, Fig. 2, in which the sheave C is secured. The sides of the block are made concavo-convex, as shown in Fig. 3, the concave being on the inside, the purpose of which is to accommodate the length of the hub D of the sheave, which, as will be seen in Fig. 4, is much greater than the thickness of the sheave, it being very projecting from each side. Around the hole in the hub is arranged a series of friction-rollers, *a*, Figs. 4 and 5, for the purpose of giving ease and freedom to the movement of the sheave. The cheeks or shell of the block are secured to each other by the screws or bolts *b*, which, when together and the sheave therein, is shown in Figs. 1 and 2. The cheeks or shell of the blocks are also much stronger than those of the ordinary pulley-block, in consequence of their being concavo-convex, which gives to the block greater strength, which for small pulleys is of much importance, as they can be made very light, and of sufficient strength for all practical uses.

The special advantage of a pulley-block constructed as above described is, that in giving to the sheave a long or wide hub, it has more bearing-surface on the spindle, and, in consequence, is much less liable to become cramped thereon in the event the strain is sidewise, instead of being direct in line with the sheave, than is a sheave having a hub no thicker than the rest part thereof, which is liable to cut into the spindle when the strain is sidewise, but which it cannot do when the hub is of the length above described; hence the sheave will run easier and be more durable.

What I claim as my invention, and desire to secure by Letters Patent, is—

1. The herein-described pulley-block, consisting of the sheave C, constructed with a wide or extended side or sides at the hub, and converging to the perimeter thereof, in combination with the concavo-convex sides A B, for receiving the sheave, substantially as and for the purpose set forth.

2. The concavo-convex cheeks or shell A B, constructed substantially in the manner as described, and for the purpose set forth.

GEORGE A. FORD.

Witnesses:

W. W. ROBINSON,

A. F. CORNELL.